United States Patent [19]
Hill

[11] Patent Number: 6,113,332
[45] Date of Patent: Sep. 5, 2000

[54] MULTI-PURPOSE FASTENING SYSTEM

[76] Inventor: Delmar J. Hill, 24 Golfview Dr., Medford, N.J. 08055

[21] Appl. No.: 08/903,205

[22] Filed: Jul. 5, 1997

Related U.S. Application Data

[60] Provisional application No. 60/021,305, Jul. 8, 1996.

[51] Int. Cl.[7] .............................. F16B 15/00; F16B 15/02
[52] U.S. Cl. ........................... 411/473; 411/475; 411/920
[58] Field of Search .................................... 411/472, 473, 411/474, 475, 920

[56] References Cited

U.S. PATENT DOCUMENTS

| | | | |
|---|---|---|---|
| 506,861 | 10/1893 | Prentice | 411/475 X |
| 770,479 | 9/1904 | Shuster | 411/472 |
| 2,741,147 | 4/1956 | Marano | 411/472 |
| 2,906,547 | 9/1959 | Bortner | 411/920 X |
| 3,960,147 | 6/1976 | Murray | 411/474 X |
| 4,691,427 | 9/1987 | Hill . | |

FOREIGN PATENT DOCUMENTS

| | | | |
|---|---|---|---|
| 823878 | 11/1959 | United Kingdom | 411/475 |

*Primary Examiner*—Neill Wilson
*Attorney, Agent, or Firm*—Sperry, Zoda & Kane

[57] ABSTRACT

An extractable fastener system is disclosed using a staple configured to secure various pliant, planar and three-dimensional materials to a substrate, which staple has a retention base including a retention arch for positioning and securing three-dimensional linear retention material to secure pliant materials to the substrate, the staple also includes an integral extraction arch or arches thereon to facilitate access for an extraction tool to facilitate removal of the staple from the work.

17 Claims, 10 Drawing Sheets

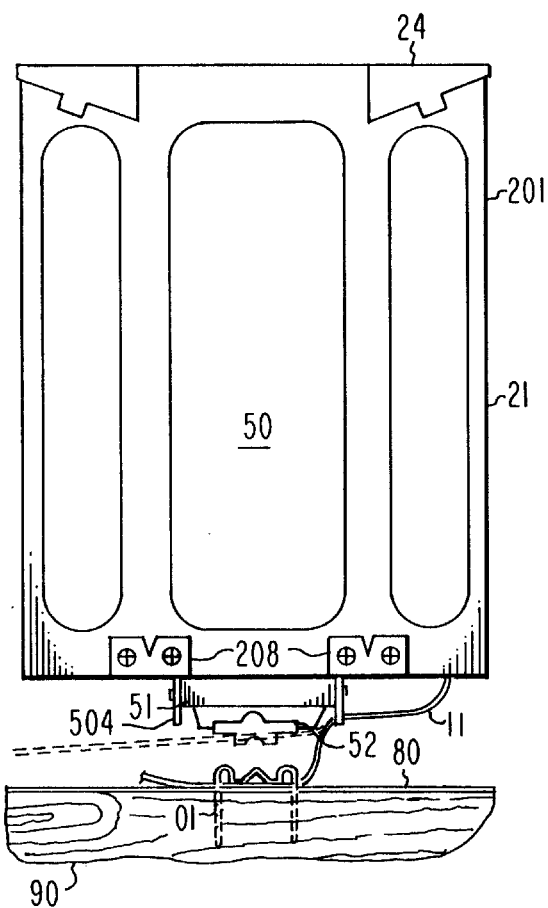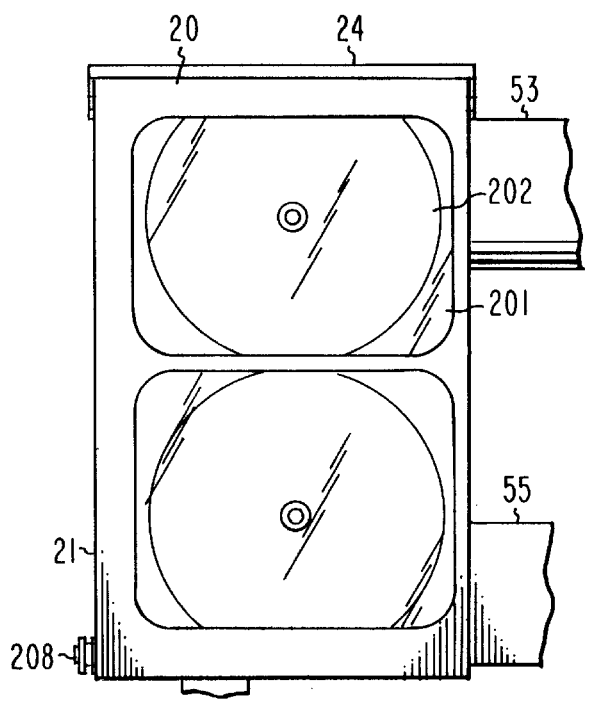
Fig. 5
Fig. 6

MULTI-PURPOSE FASTENING SYSTEM

Applicant hereby claims priority rights of States Provisional Patent Application No. 60/021,305 filed Jul. 8, 1996 by Delmar J. Hill on a Multipurpose Fastening System For Construction.

A construction fastener system integrating a (a) new genre of wire fasteners, (b) tools pneumatically, electrically or manually activated to store, feed and drive those fasteners, (c) rewind-prevention cassettes in (d) canisters to store reels and optionally dispense through (e) guides (f) a linear retention material under and proximate to fasteners driven by tool to which is attached a (g) linear material cutting tool, plus an (h) extraction hand tool with teeth extending longitudinally and transversely with which to extract those fasteners of temporary configuration. These interdependent artifacts make more efficient both the permanent and temporary installation of HVAC duct, plumbing piping, overhead insulation, wire for T.V., telephone, intercom and the like, and plywood and plastic sheeting, and make far more efficient the removal of this system's temporary fasteners and the salvaging of all disassembled materials for potential reuse.

BACKGROUND OF THE INVENTION

The basic design of construction fasteners has not changed in generations. This has resulted in the common use of hammer-driven fasteners where rapid-fire tool-driven fasteners should be used, in the use of flush-driven, permanent-use fasteners for attaching temporary enclosure construction that will later be disassembled, in the use of conventional fasteners to secure materials prone to wind damage such as building felt on building's exteriors, and so on.

The absence of a new genre of fasteners has resulted in billions of dollars of world-wide losses from wasted labor and materials lost to damage from disassembling materials temporarily applied with permanent fasteners, from wind damage to building felt secured with conventional fasteners days or even weeks before roofing or siding is applied, and so on.

Enormous sums of money can be saved globally by a new genre of fasteners, some of which are configured to be easily and quickly extracted from temporary construction secured with any strong linear material such as fiber-reinforced strapping or braided nylon cord which in turn, in combination with the fasteners, immobilize and attach any large areas of any pliable sheeting to enclose, cover and protect various materials under construction, in-transit or stored where exposed to the weather. Further, all materials in such temporary construction are, when disassembled, undamaged and reusable. Under current permanent-fastener use, there is a huge loss globally just from the cost of collecting, loading and disposing of damaged material and the splintered, fastener-laced and accident-causing battens used to secure those materials.

MULTI-PURPOSE FASTENING SYSTEM FOR CONSTRUCTION

The primary object of this invention is to integrate a fastener-driving tool, various optionally disparate fasteners, reels of three-dimensional linear material, and an extraction tool into an interdependent system designed to efficiently optionally secure that linear material to a pliable or firm surface, permanently or temporarily, and as efficiently remove those fasteners configured for temporary use.

Another object of this invention is to provide a multi-purpose system for temporarily affixing any thin pliable or solid fastener-penetrable material to any fastener-penetrable backing, optionally using one of various flexible, linear retention materials affixed by fasteners configured with extraction arches to give access to an extraction tool affording the quick, efficient, intact removal of all intended materials.

Another object of this invention is the providing of the ability to optionally control and direct, through channels in the tool and guides adjustably affixed to the fastener driving tool, a flat, linear retention material from the dispensing canister to a predetermined point where said linear material is under, proximate to and parallel with the long axis of the fastener crown as it is driven.

A further object of this invention is to detachably affix refillable canisters containing reels of thin, linear retention material to the tool that drives those fasteners through or astride that linear material, through and/or into another fastener-penetrable material to hold the combination in place.

A further object of this invention is to optionally and detachably affix those canisters to a variety of remote carriers such as an overhead trolley, a wheeled cart or a worker's belt.

A further object of this invention is to control and guide any three-dimensional linear material from reels in those canisters to a point directly under and proximate to the fastener to be optionally driven through or astride that linear material.

A further object of this invention is to provide a class of tool-driven fasteners to permanently or temporarily affix to a fastener-penetrable surface a variety of telephone, T.V., intercom, 12-V wire or the like stored in and dispensed from casettes in canisters attached to the fastener-driving tool or other carrier through guides to a point under and proximate to the driven fastener.

Another object of this invention is to provide a genre of wire fasteners on which the underside of all of the fasteners is serrated 0.010 on a line parallel to the length of the crown.

Another object of this invention is to provide a temporary fastening system in which 1,000 ft. of three-dimensional linear retention material can be, after use, reused, and taken from the site of its removal in a garbage bag rather than the 2 pickup trucks needed to remove the 2,000 ft. of wood batten strips now used to accomplish the same retention-strip disposal task.

A further object of this invention is to integrate various artifacts into a temporary fastening system that, when the fasteners are removed, leaves the linear retention material and the retained sheet plastic or other material intact, undamaged and reusable.

Another object of this invention is to provide a fastening system that optionally includes a multi-purpose fastener that combines the single leg of a nail with the linear crown of a staple, that hybrid available with various functional head configurations allowing that genre of fasteners to be used for either the economical temporary or permanent attachment of various artifacts to any fastener-penetrable structure.

A further object of this invention is to provide a multi-use extraction tool configured to penetrate the extraction-arch of and efficiently extract temporary fasteners of both dual-leg and hybrid single-leg configuration.

Another object of this invention is to provide a multi-use extraction tool configured with serrated-top extraction teeth extending parallel to the tool's long flat axis and serrated-top extraction teeth extending transverse to the tools long flat axis, these teeth paired, aligned and facing in opposing directions.

Yet another object of this invention is to offer an extraction tool configured with serrated-top extraction teeth both extending from the end of the tool on a line parallel to its long axis, and serrated-top extraction teeth extending transversely from the sides of an aperture proximate to the center of the extractor blade.

Yet another object of this invention is to provide a fastener extraction tool configured to both include a leverage angle and to fold at a hinge at that angle into a tool that is, when not in use, shorter, more compact and easy to carry in a pocket or tool pouch.

BRIEF DESCRIPTION OF THE DRAWINGS

FIG. 5 is a front view of a fastener-driving tool with attached canisters.

FIG. 6 is a side view of that combination of canister and fasten-driving tool.

DETAIL

Figures 1, 2:
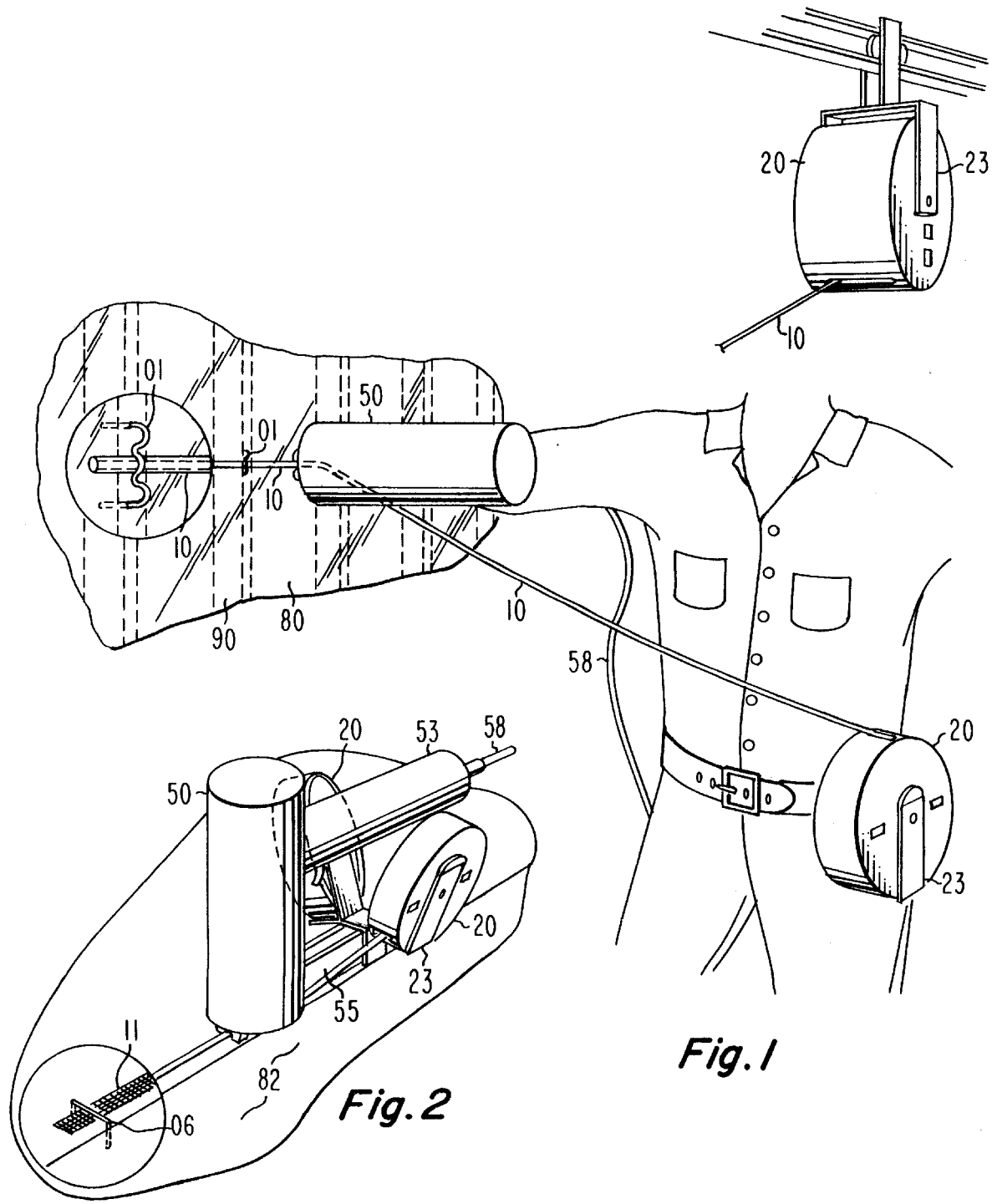
FIG. 1 is a perspective view of but one combination of some of the artifacts in this fastening system.
FIG. 2 is a perspective view of another combination of some disparate artifacts in this fastening system.

Referring in detail to the drawings, FIG. 1 illustrates one combination of belt-attached canister 20 containing a reel dispensing a structural cord 10 to a remote fastener-driving tool 50 and a driven temporary fastener 01 astride cord 10.

FIG. 1 also illustrates a larger volume canister suspended from a trolley on an overhead monorail, this a preferred mode for efficient production in a controlled environment such as a manufacturing plant where several thousand feet of linear retention material or cable is applied daily.

FIG. 2 is a perspective view of a fastener driving tool 50 with bias-mounted canisters 20 from which is dispensed a structural strapping 11 to be secured to building felt 82 by driven fastener 06.

Figure 3:
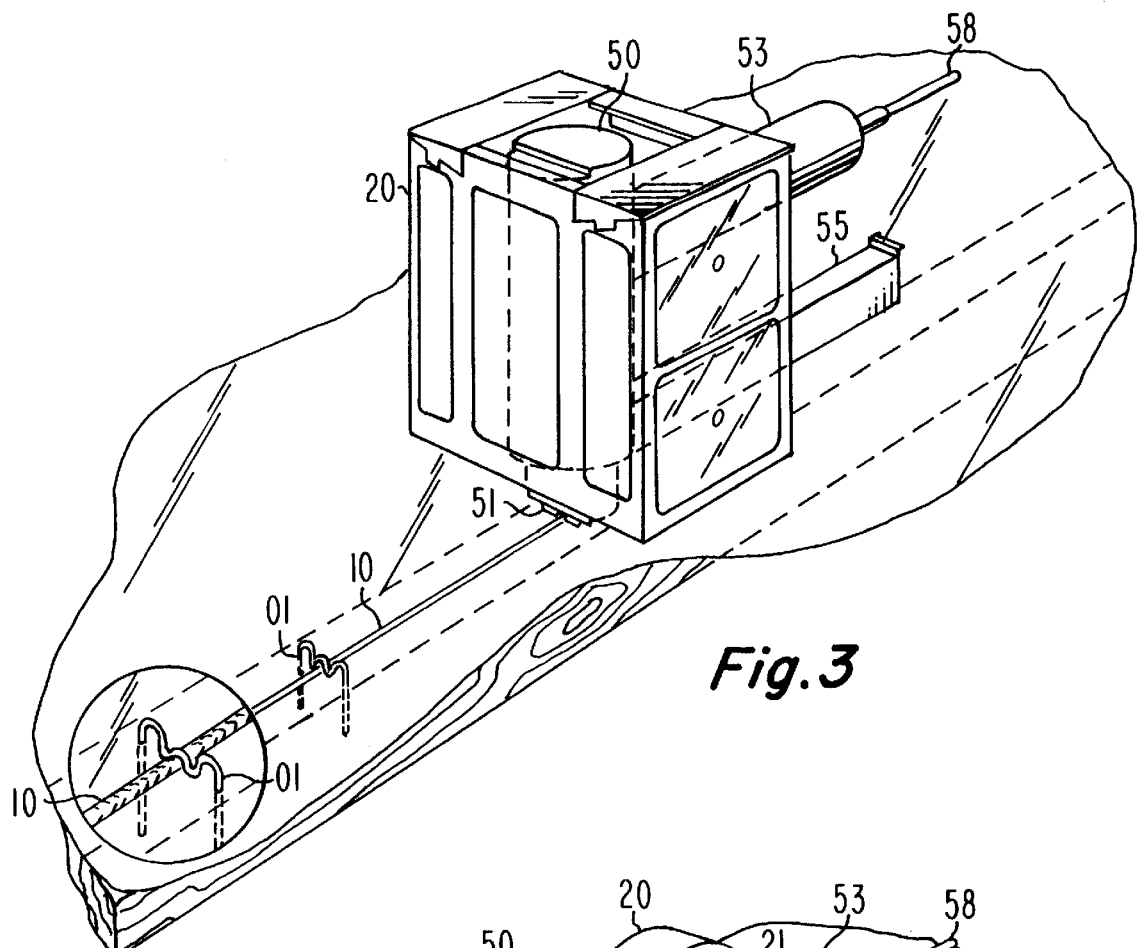
FIG. 3 is a perspective view of a variation in this fastening system with disparate reel-holding canisters.

FIG. 3 shows in perspective but one arrangement of this system with dual vertical canisters 20 attached to the fastener driving tool 50.

Figure 4:
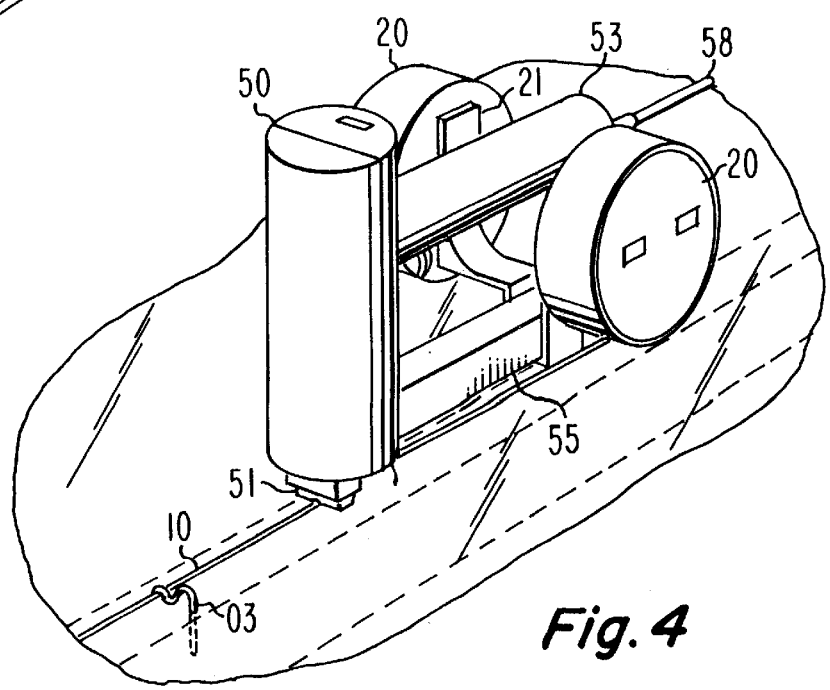
FIG. 4 is a perspective view of another variation of the artifacts in this fastening system.

FIG. 4 is a perspective view of dual canisters 20 mounted toward the rear of the fastener-driving tool 50.

Another view of this system is the elevation, FIG. 5, showing canisters 20 attached with brackets 21 to a fastener driving tool 50. Adjustably attached to the driving head 51 is one of adjustable guide bases 302 holding a cord or wire guide 303 and a flat strapping guide 304, illustrating strapping 11 extending from a canister 20 through the guide 304 down to a plastic sheet 80 where it has been affixed by a temporary fastener of removable configuration 03 driven into a wood member 90.

FIG. 6 is a side elevation of one configuration of a canister 20, the driving tool handle 53 and the magazine 55 that holds and dispenses the fasteners.

Figure 7:
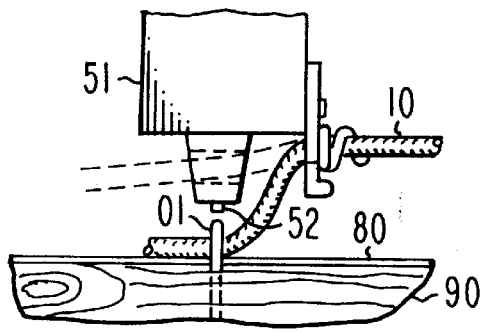
FIG. 7 is a full size view detail of the fastening combination of one type of fastener astride one type of linear retention material.

FIG. 7 is an enlarged-in-part side elevation view of a portion of this invention showing a temporary fastener 01 driven astride a linear retention material 10 which affixes a plastic sheeting 80 over spaced wood members 90.

Figure 8:
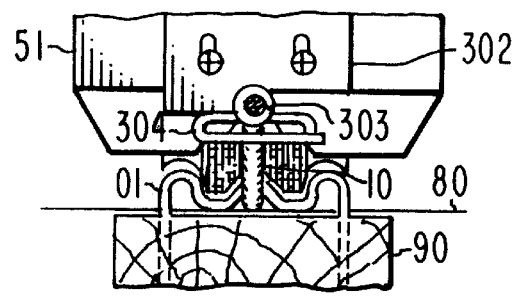
FIG. 8 is a full size rear view detail of that same combination.

FIG. 8 is an enlarged-in-part rear elevation view of the side elevation view illustrated in FIG. 7, showing one configuration of this inventions temporary fastener 01 driven astride a linear retention material 10 which, in conjunction with the fastener 01 is temporarily affixing plastic sheeting 80 to a wood member 90.

Figure 9:
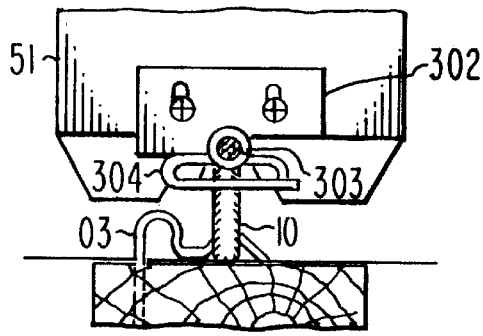
FIG. 9 is a full size rear view detail of that same combination but showing another fastener configuration.

FIG. 9 is the same rear elevation view, enlarged-in-part, of the artifacts that form a key part of this invention, with the exception that the temporary fastener shown is a hybrid single-leg wire fastener 03 with a single extraction arch and a single retention arch.

Figure 10:
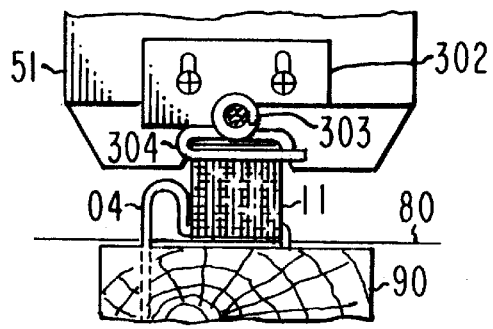
FIG. 10 is a full size rear view detail of that same combination but showing still another fastener and linear retention material configuration.

FIG. 10 is a rear elevation view of the same artifacts as those in FIG. 8 and FIG. 9, with the exception that the temporary fastener shown is a hybrid single-leg wire fastener 04 with a single extraction arch and a flat retention head, and the linear retention material is a flat strapping.

Figure 11:
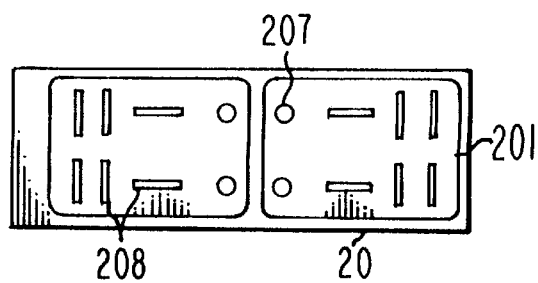
FIG. 11 is a bottom end view of a cassette and canister.

FIG. 11 illustrates the dispensing end of a cassette 201 in a canister 20 having a series of openings for dispensing two likely configurations of the linear materials from reels in the cassette 201.

Figure 12:
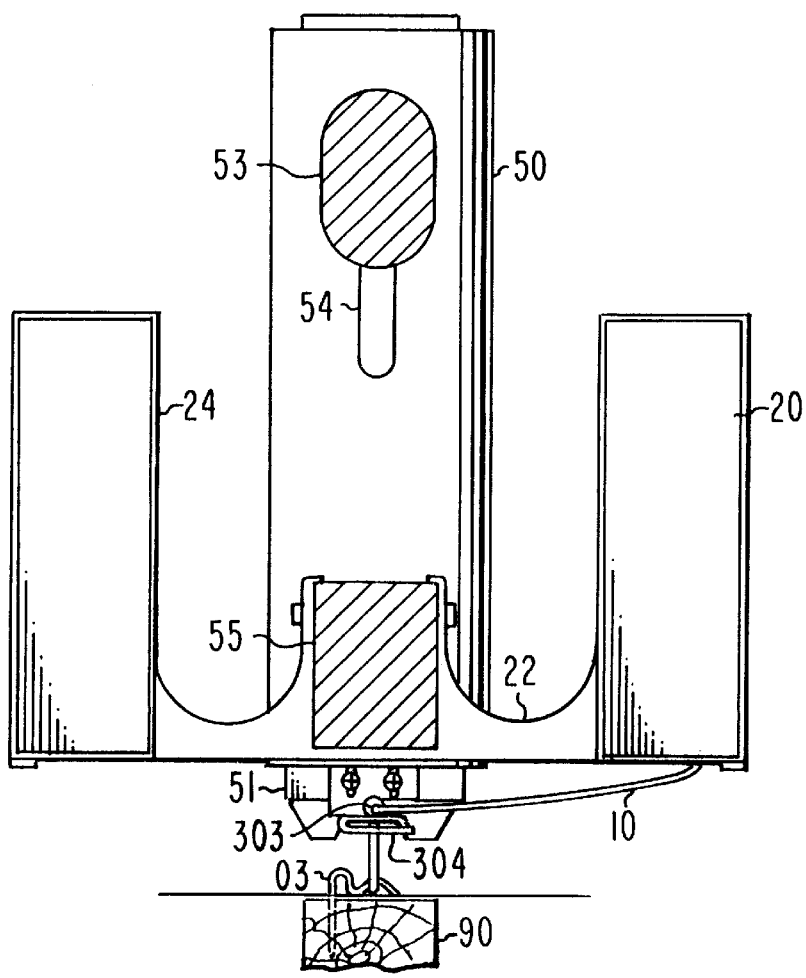
FIG. 12 is a rear view of a fastener-driving tool with horizonatally attached canisters.

FIG. 12 is a rear elevation view of the artifacts used in FIG. 11 above. Linear material 10 is dispensed from the canister 20 through a guide 303 to a point under and proximate to the driven fastener 03, thus temporarily affixing plastic sheeting 80 to an underlying wood member 90. It should be noted that the shown fastener 03 configuration is one of two fasteners, 03 and 04, that are designed to also hold in place such artifacts as T.V., intercom, 12-volt and other wire to wood member 81 or 90, where those linear or plane artifacts may later be removed and/or replaced.

Figure 13:
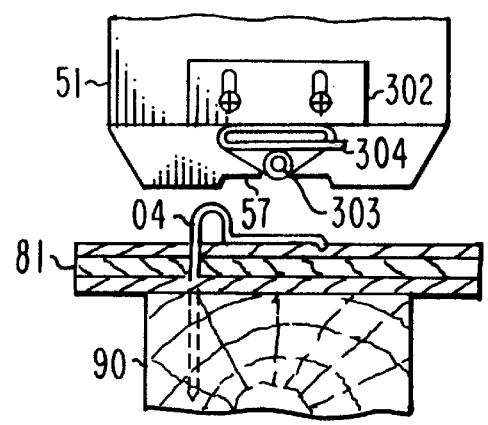
FIG. 13 is a full size rear view detail of a fastener temporarily attaching plywood to a wood member.

FIG. 13 is a rear elevation view of a hybrid single-leg wire fastener 04 with a single extraction-arch driven into plywood 81 to temporarily attach that plywood to a wood member 90.

Figure 14:
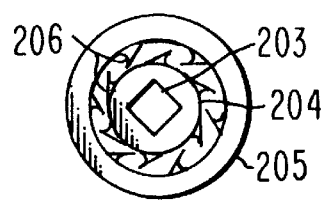
FIG. 14 is a full size cross section view of the rewind-prevention core of the cassette-reel combination.

FIG. 14 is a cross section view of the center of each reel of linear material dispensed from the cassettes 201, the square shaft 203 integral with the canister 20, and the two part reel hub 204 and reel core 205 having opposing slanted ratchet teeth 206 to prevent the accidental recoiling of the linear material.

Figure 15:
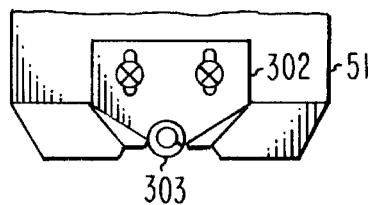
FIG. 15 is a rear elevation view, in part, full size, of the tool's driving head.

FIG. 15 is a rear elevation view, in part, full size, of the tool's driving head 51 to which is attached an adjustable guide base 302 holding cord guide 303, this designed to facilitate quick insertion of the braided cord 10 in the guide 303 and place the cord 10 under and proximate to a driven fastener.

Figure 16:
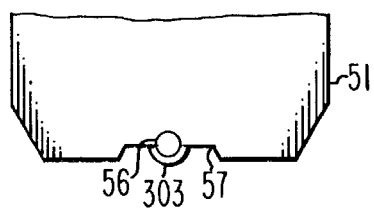
FIG. 16 is a front elevation view, full size, of the same tool driving head.

FIG. 16 is a front elevation view, full size, of the same tool driving head 51 showing the alignment of the cord guide 303 with the tool's driving head cord channel 56.

Figure 17:
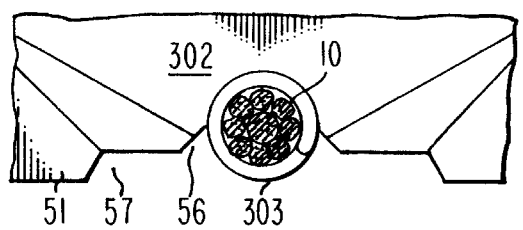
FIG. 17 is an enlarged rear-elevation detail, in part, of the lower portion of the driving head.

FIG. 17 is an enlarged detail, in part, of the lower portion of the driving head 51, cord guide 303 with inserted braided structural cord 10 aligned with the driving head cord channel 56.

Figure 18:
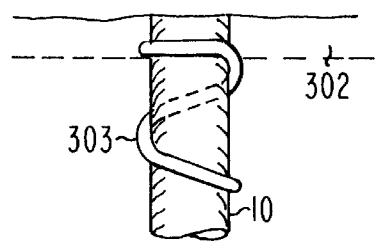
FIG. 18 is an enlarged detail, in part, top or plan view of cord inserted into cord guide.

FIG. 18 is an enlarged-in-part top, or plan view of cord 10 inserted into cord guide 303 which is made integral with an adjustable guide base 302. Note that the cord guide 303 is configured to facilitate the quick insertion of cord 10 into cord guide 303 which is aligned with and proximate to the driving head cord channel 56.

Figure 19:
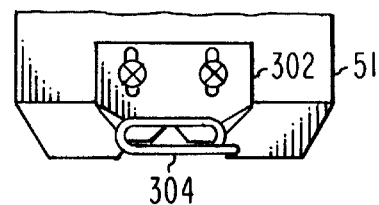
FIG. 19 is a rear elevation view, in part, full size, of the tool's driving head.

FIG. 19 is a rear elevation view, in part, full size, of the tools driving head 51 to which is attached an adjustable guide base 302 holding strapping guide 304, this designed to facilitate quick insertion of the strapping 11 in the guide 304 and place the strapping 11 under and proximate to a driven fastener.

Figure 20:
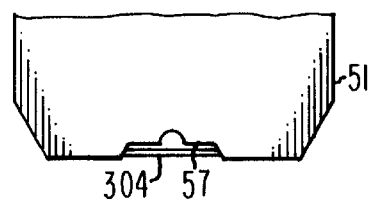
FIG. 20 is a front elevation view, full size, of the same tool's driving head.

FIG. 20 is a front elevation view, full size, of the same tool driving head 51 showing the alignment of the strapping guide 304 with the tool's driving head strapping channel 57.

Figure 21:
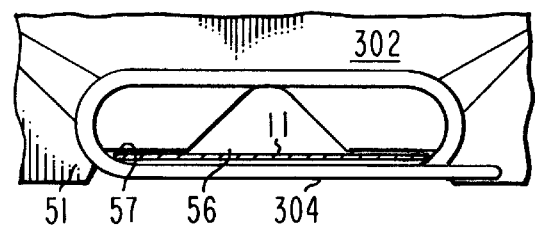
FIG. 21 is an enlarged rear elevation detail, in part, of the lower portion of the driving head.

FIG. 21 is an enlarged-in-part detail, of the lower portion of the driving head 51, strapping guide 304 with inserted strapping 11 aligned with the driving head strapping channel 57.

Figure 22:
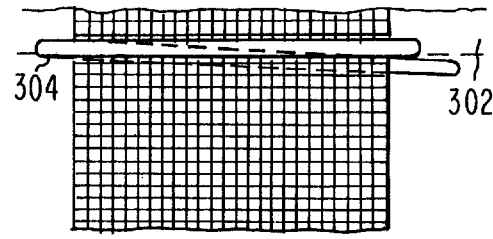
FIG. 22 is an enlarged detail, in part, top or plan view of strapping inserted into strapping guide.

FIG. 22 is an enlarged-in-part top or plan view of strapping 11 inserted into strapping guide 304 which is made integral with an adjustable guide base 302.

Note that the strapping guide 304 is configured to facilitate the quick insertion of strapping 11 into strapping guide 304 which is aligned with and proximate to the driving head strapping channel 57.

To place cord 10 in the guide 303, the worker simply holds the end of the cord 10 under the near end of the guide 303 and winds the cord 10 counterclockwise into the guide 303 while pulling the cord 10 away from the canister 20 toward the driving head 51.

To use this variation of this fastening system, the worker first manually pulls the cord a few inches past the driving head cord channel 56, holds the driving head against the material surface to be secured by cord 10, and triggers the tools fastening mechanism. When the first fastener is driven astride cord 10, the worker simply has to back the tool away from the first driven fastener. The cord 10 will stay relatively taught, thus staying in the driving head guide 303 and therefore being centered under any driven fasteners. At the end of any surface being thus secured, the worker can cut the cord 10, and repeat the procedure until the entire surface is secured, either temporarily or permanently, depending on the fasteners used.

All canisters have linear material egress apertures that are deliberately undersized to constrict the withdrawal of linear material, thereby keeping tension on that material between the canister through the guides and channel and the last driven fastener.

To place strapping 11 in the guide 304, the worker holds the left edge of the end of the strapping 11 over the right extension of the lower guide 304 wire, depresses the strapping 11 end and slides the strapping 11 to the left until the right edge of the strapping 11 clears the hook on the lower right rear of the guide 304. Once the end of the strapping 11 is contained 360 degrees within the guide 304, the worker manually pulls the strapping 11 a few inches past the driving head strapping channel 57, and follows the same procedure as in the cord 11 fastening.

While the cord 10 fastening of materials in this system is used for temporarily securing a material surface, the strapping 11 fastening of materials can be either permanent using fasteners 06 or 08, or temporary using fasteners 01, 02, 03 or 04. The permanent fastening of communications wire in open spaces can be accomplished with fasteners 05 or 07, while the permanent securing of such communications wire with the option to later efficiently remove that wire can be accomplished with fastener 03.

Figure 23:
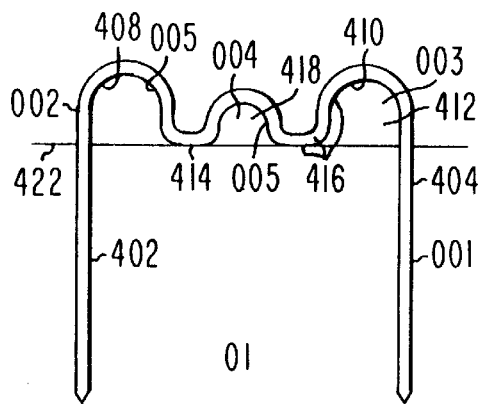
FIG. 23 is an enlarged view of a temporary fastener that is included in this invention.

FIG. 23 is an enlarged view of one of the wire fasteners 01 illustrating the extraction arches 003, the retention arches 004, and the serrated underside 005 that is common to all of the fasteners in this invention.

The serrations are to prevent the temporary fastener's extraction arches 003 from slipping off an extraction tool, to inhibit slippage under the retention arches, and to lend a better fastener grip on any material held by flat retention heads such as those in fasteners 02, 04, 06 and 08.

Figure 24:
FIG. 24 is an enlarged view of the serrated underside of the fasteners in this invention.

FIG. 24 is a view of the underside of the wire fasteners in this invention, illustrating the serrated surface 005.

FIG. 25, 26, 27 and 28 are illustrations of temporary fasteners in this invention, each designed for a different use.

FIG. 29, 30, 31 and 32 illustrate the permanent fasteners in this invention, each with serrated undersides.

Also, note that in all hybrid single leg temporary and permanent fasteners, the end of the head opposite the single leg is deliberately depressed slightly below any other part of the head transverse to that single leg.

Figure 27:
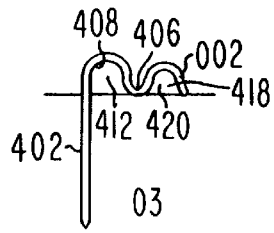
FIGS. 26 through 28 are full size views of other use-oriented-configuration temporary fasteners in this invention.
Figure 31:
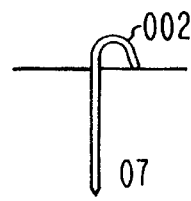
FIGS. 29 through 32 are full size views of use-oriented-configuration permanent fasteners in this invention.
Figure 28:
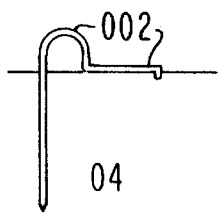
Figure 32:
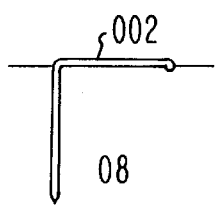
Figure 25:
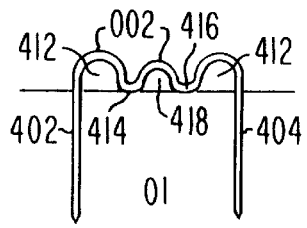
FIG. 25 is a full size view of the fastener in FIG. 23.
Figure 29:
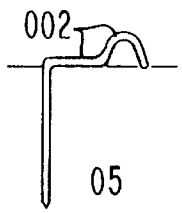
Figure 33:
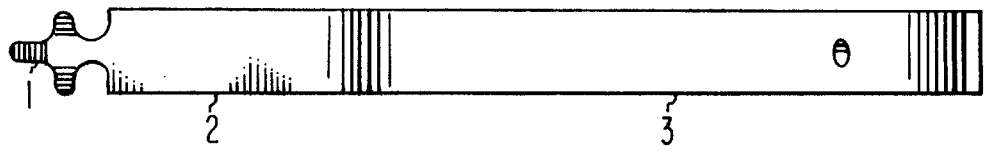
FIG. 33 is a plan view of an extraction tool configured to extract only the temporary fasteners in FIGS. 27 and 28.

FIG. 33 is a top view of a basic extraction tool for temporary fasteners in FIG. 27 and FIG. 28, illustrating the formed flat-bar and serrated-top teeth 1. The configuration of this tool and all extraction tools illustrated in this invention allow for the efficient extraction of the hybrid fasteners in FIG. 27 and FIG. 28 by either right handed or left handed workers, whether the fastener is driven with the crown parallel to or transverse to any narrow wood member into which the fastener is driven, and no matter what fastener-penetrable material those fasteners are driven to hold.

Figure 34:
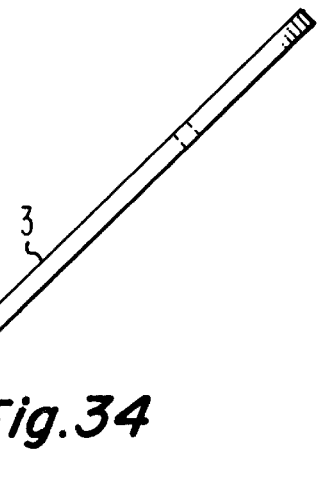
FIG. 34 is a side view of that same extraction tool.

FIG. 34 is a side elevation view of the extraction tool illustrated in FIG. 33.

Figure 35:
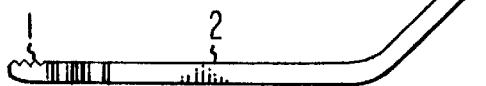
FIG. 35 is a top view of that extraction tool placed to extract the temporary fastener in FIG. 27 driven transverse to a wood member.
Figure 35:
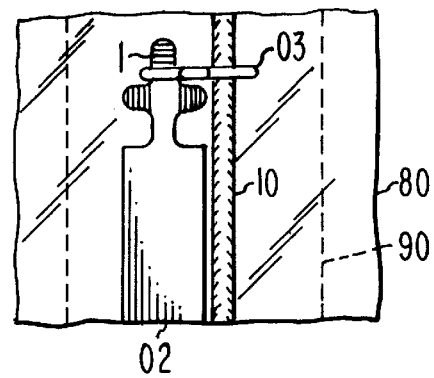

FIG. 35 is a top view of this extraction tool positioned to extract temporary fastener 03 when that fastener is driven transverse to a 1½ inch wide wood member 90.

Figure 36:
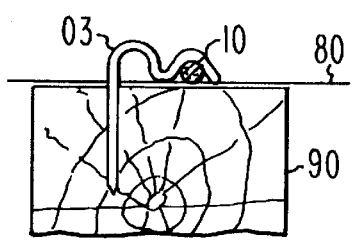
FIG. 36 is a rear view of the temporary fastener shown in FIG. 35.

FIG. 36 is a cross section view of the retainer cord 10 affixing plastic sheeting 80 to the wood member 90, and showing the hybrid temporary fastener 03 with the retention arch astride the cord 10.

Figure 37:
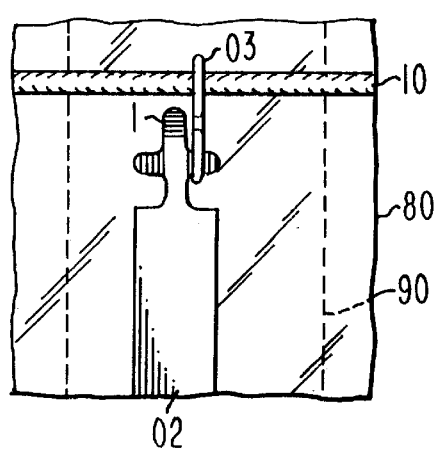
FIG. 37 is a top view of this extraction tool positioned to extract that temporary fastener driven parallel to a wood member.

FIG. 37 is a top view of the same artifacts illustrated in FIG. 36, but with the temporary fastener 03 driven parallel to the wood member 90.

Figure 38:
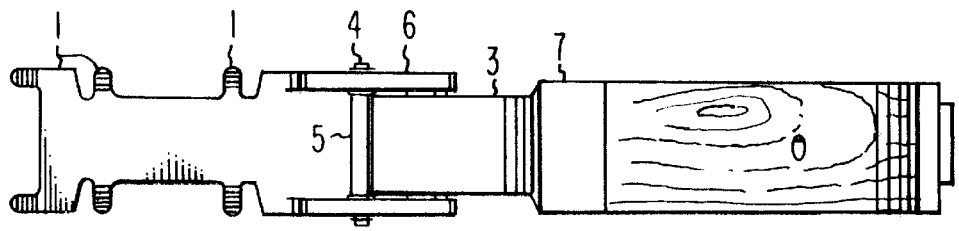
FIG. 38 is a top view of a folding extraction tool with six serrated-top extraction teeth.

FIG. 38 is a top view of a hinged, folding extraction tool configured to extract all of the temporary fasteners shown in FIG. 25, 26, 27 and 28. The serrated-top extraction teeth 1 in this tool all face out, and the tool is configured to extract all temporary fasteners whether driven parallel or transverse to any wood member into which they are driven.

Figure 39:
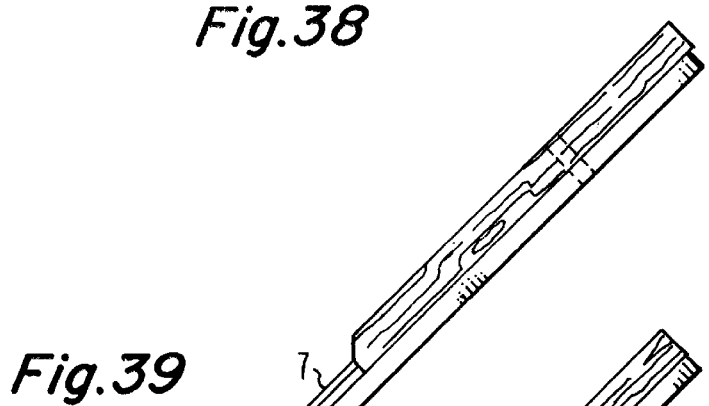
FIG. 39 is a side view of that same tool.

FIG. 39 is a side elevation view of this tool illustrating the extraction teeth 1, the hinge pin 4, the magnet 7 that holds the tool in closed position, and the handle 3.

Figure 40:
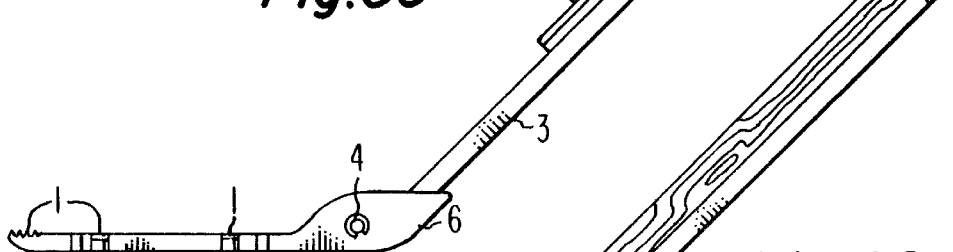
FIG 40 is a side view of that same tool folded.

FIG. 40 is a side elevation view illustrating the tool folded into a pocket-size-configuration, with a magnet 7 holding the tool in the folded position.

Figure 41:
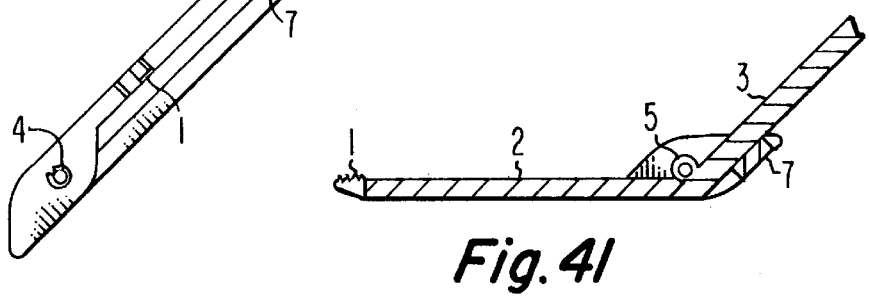
FIG. 41 is a cross section view of that same tool, open.

FIG. 41 is a cross section view of this tool, illustrating the hinge pin 4, hinge cylinder 5, hinge base 6, a magnet 7 that holds the tool open, flat bar handle 3 and serrated extraction teeth 1.

Figure 42:
FIG. 42 is a top view of a more commonly configured extraction tool of the type used for conventional nails and staples, with the same folding handle shown in FIG. 38.

FIG. 42 is a partial top plan view of the folding tool illustrated in FIGS. 38 through 41, but with the extraction head conventionally configured as a flat bar conventional fastener puller and pry-bar.

Figure 43:
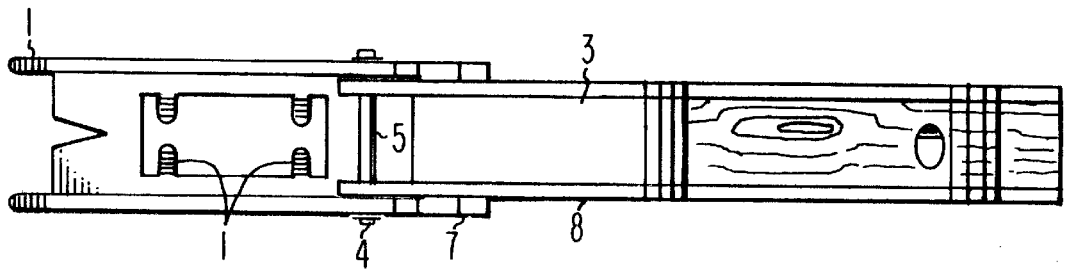
FIG. 43 is a top view of a flanged, folding, six extraction-teeth tool with four inward-facing serrated-top extraction teeth in an aperture centered in the extraction blade.

FIG. 43 illustrates a flanged folding extraction tool with two end-extended serrated-top extraction teeth 1 and two pair of inwardly facing serrated-top extraction teeth 1 in a laterally centered aperture, the hinge pin 4 and a multi-position magnet 7 which holds the folding tool either open or closed.

Figure 44:
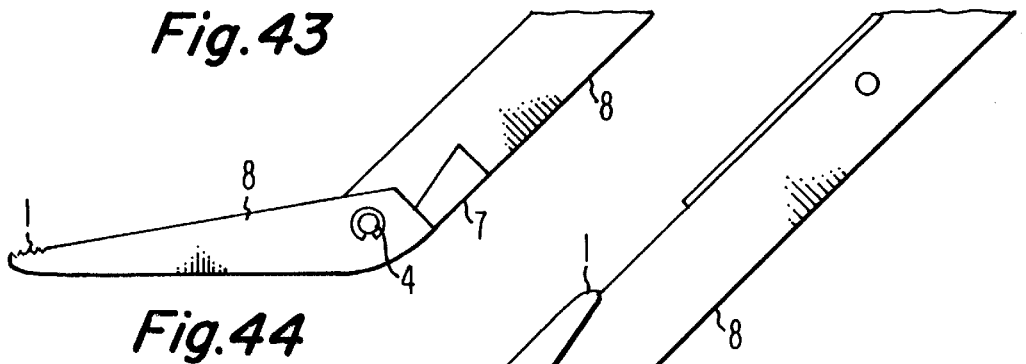
FIG. 44 is a side view of that same tool.

FIG. 44 is a side elevation view of this flanged extraction tool illustrating the serrated-top teeth 1, hinge pin 4 and magnet 7.

Figure 45:
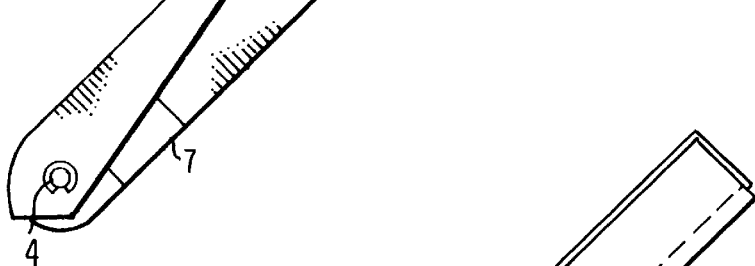
FIG. 45 is a side view of that same tool folded.

FIG. 45 is a side elevation view of this flanged extraction tool when folded closed.

Figure 46:
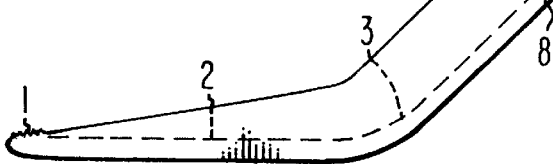
FIG. 46 is a side view of the non-folding model of the same extraction tool shown in FIG. 43.

FIG. 46 illustrates the fixed-position flanged extraction tool.

Figure 47:
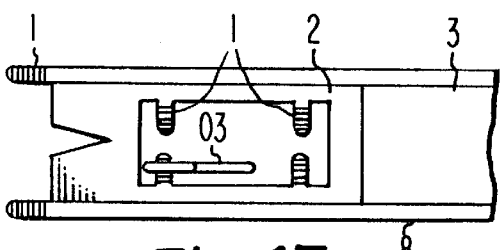
FIG. 47 is a partial plan view of the fixed-configuration extraction tool shown in FIG. 43, showing the tool positioned to extract a temporary fastener driven parallel to a wood member as in FIG. 37.

FIG. 47 is a top plan view of the fixed-position extraction tool with six serrated-top extraction teeth 1, four of those teeth facing inward in a lateral aperture, with one of those four aperture teeth positioned under the extraction arch of a hybrid, single leg wire fastener 03.

The extraction tools shown in FIG. 43 through FIG. 47 are configured to extract any of the temporary fasteners illustrated in FIGS. 25, 26, 27 and 28 whether they are driven parallel to or lateral to any narrow underlying wood member into which they are driven, whether the worker is right or left handed.

The aperture gap between the two pair of inwardly facing serrated extraction teeth 1 is to allow the worker to quickly position the tool's aperture over any of the temporary fasteners 01, 02, 03 or 04, slide the tools extraction blade right or left until one or two of the aperture extraction teeth are under the extraction arch or arches of the fastener to be extracted, and apply leverage to the tool handle to extract that fastener. In the case shown in FIG. 47, fastener 03 is used to illustrate only one of several possible fastener-extraction tool configurations.

It should be pointed out that while permanent fasteners are commonly coated to adhere the fastener legs to the wood member into which they are driven, the temporary fasteners illustrated in FIG. 25, 26, 27 or 28 would commonly not be coated to adhere the fastener legs to the underlying wood. Therefore, less sturdy extraction tools are necessary to extract those temporary fasteners.

The top of the extraction tool teeth are serrated laterally, and the bottom side of all of the fasteners in this invention are serrated parallel to the crown, this done to inhibit extraction slip-off in the temporary fasteners, and to inhibit the slippage of any material secured either temporarily or permanently by any of the fasteners in this invention.

While the fasteners in this invention appear to have a common leg length and wire size, the principles in this invention are intended to illustrate fasteners with shorter legs and narrower crowns to secure, for example, a light-gauge plastic enclosure around stuffed furniture, to a heavier gauge wire fastener 02 with three inch long legs for temporarily assembling construction-site wood fencing or pedestrian shelter over sidewalks around urban construction sites.

As shown best in FIG. 23, the construction staple device of the present invention is of significant importance. In particular as shown in FIG. 23, the preferred configuration includes a first insertion leg means 402, and a second insertion leg means 404 located on lateral opposite ends of the construction staple. Preferably these members extend downwardly and the depth of downward extension can vary depending on the amount of penetration into the substrate 422 which is desired in a particular application. In the preferred configuration shown in this figure, the first extraction arch 408 and the second extraction arch 410 will be positioned immediately adjacent to the first and second insertion legs 402 and 404 in such a manner as to facilitate ease of removal of the staple from the substrate 422 by using the mechanical advantage of prying within these arches 408 and 410.

The retention biasing head 406 will be positioned immediately adjacent the extraction arches 408 and 410 toward the center of the staple. With the configuration of FIG. 23, a first retention biasing head 414 and a second retention biasing head 416 will be positioned immediately adjacent to the respective extraction arches. Each of these retention biasing heads will be adapted to contact the substrate 422 therebelow responsive to driving of the first and second insertion legs 402 and 404 downwardly into the substrate in order to assure securement of the staple to the substrate, as well as securing of a three-dimensional or planar workpiece with respect thereto. It is preferable that the extraction openings 412 be positioned as close as possible to the insertion legs 402 and 404 in order to enhance the mechanical advantage of prying thereof to facilitate extraction.

The various configurations for the staple as shown in the figures on sheet 7 show the normal depth of penetration of the staple leg. However, these legs can vary significantly in depth based upon the amount of penetration required and based upon the material being used and the purpose or function of the staple. The length of the leg can vary significantly and can be as long as three inches. It should be appreciated that the length of the insertion leg shown in the figures on sheet 7 are for the purposes of illustration only and are not intended to limit the scope and broadness of the present invention as claimed.

In the preferred configuration shown in FIG. 23, a retention arch 418 is centrally defined positioned between the first and second retention biasing heads 414 and 416 in such a manner as to assure affixing thereof and retention of round members such as cords, cables, lines and other tubular members which are often desired to be secured in construction environments to residences and commercial establishment. This retention arch 418 will preferably define a retention opening means 420 therewithin similarly shaped to the article desired to be retained therewithin.

Figure 26:
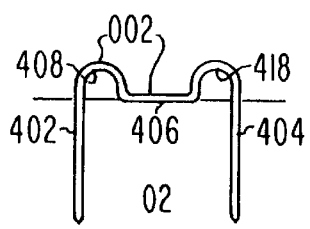
Figure 30:
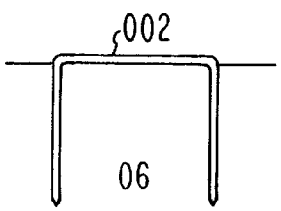

FIG. 26 is an alternative configuration wherein the centrally located retention arch 418 is not included. Instead the retention arch 418 will be positioned on one side of the centrally located retention biasing head means 406, and the extraction arch 408 will be positioned on the opposite side thereof. This is an alternative configuration for specific applications wherein different dimensional parameters are required or desired. The configuration shown in FIG. 27 is another alternative configuration which uses only a singular insertion leg means 402 with the first extraction arch 408 positioned immediately thereadjacent and defining the extraction opening 412 therein. Adjacent to the first extraction arch 408 and immediately to the right thereof as shown in FIG. 27, is the retention biasing head 406 for limiting downward depth insertion of the insertion leg 402 and providing downwardly directed bias upon the substrate 422 to facilitate the possible retaining of a planar workpiece upon the substrate.

Further immediately adjacent to the right, the retention arch 418 is defined for retaining round cable or other tubular three-dimensional workpieces thereto, and it defines the opening 420 which is arcuate or partially circular in order to facilitate retaining of such tubular or otherwise round members.

In FIG. 24, serrations are shown extending longitudinally with respect to the direction of the staple. These serrations preferably extend along the undersurface of the extraction arches 108 to facilitate gripping during extraction of the staple. They also extend on the undersurface of the retention biasing heads 414 and 416 to facilitate gripping thereof of a planar workpiece secured therebelow with respect to the substrate 422. These serrations are also defined on the undersurface of the retention arch 418 to facilitate gripping of ground or arcuate three-dimensional workpieces to be retained therewithin. These serrations can preferably run parallel or longitudinal with respect to the direction of the staple construction itself as shown in FIG. 23, however, that can in certain desired applications run perpendicular or lateral with respect thereto.

While the assembly including the cord guide 303 combined with the strapping guide 304 are commonly illustrated in a strapping-over-cord configuration, FIG. 13 illustrates the reverse configuration of strapping guide 304 over cord guide 303.

While some of the linear material guides are shown paired as in FIG. 12 and 13, others are shown alone, as in detail FIG. 17 and 21. Where two canister-reels of disparate linear materials are used, as is possible in FIG. 2 and FIG. 12, paired guides are obviously necessary. Where only one linear material is used consistently, only one guide that conforms to that linear material is required.

Should a change be made in that linear material that involves many thousands of linear feet of that material, the guide and base can be quickly changed.

The various canisters illustrated and the manner in which those disparate configurations are attached to fastener-driving tools, workers belts or trolleys suspended from overhead monorail are indicative of some of the linear material supply modes available in this invention.

The canisters in FIG. 1 are only two examples of the efficient handling and dispensing of linear material at the point of application, with the large volume canister in the trolley suspended from a monorail being the most productive means of the use of this system in a manufacturing plant, and the belt-suspended or tool-attached canister being the most efficient application where the worker is outside or in a hostile weather environment.

In cases where plywood or other wood is temporarily affixed to any fastener-penetrable material, linear retention material is obviously not required to secure the temporarily fastened material. Where any volume of such temporary or permanent fastening of plywood is required, for example, the linear retention material reels and canisters can simply be detached or, if remote, not used.

Depending on the combination of factors including the size of the area to be wrapped, covered and/or secured, ease and safety of worker access, whether the area to be wrapped or covered is subject to weather and wind or instead is new construction carpet cover, whether the system is used to permanently attach small gauge communications wire to attic framing and basement ceilings, the disparate fasteners, linear retention material, canisters, cassettes and extraction tools if appropriate, the system that is this invention is designed to satisfy any construction-fastening need efficiently and economically.

What is claimed is:

1. An extractable construction staple device particularly usable for removably fastening three-dimensional and planar workpieces to a substrate comprising:

A. an insertion leg means adapted to be inserted downwardly into a substrate therebelow to facilitate securement of the construction staple with respect thereto;

B. a retention biasing head means being responsive to insertion of said insertion leg means into the substrate to exert downwardly directed force against the substrate and any planar workpiece positioned thereon, said retention biasing head means also limiting the depth of penetration of said insertion leg means into the substrate;

C. a retention arch means being arcuate in shape and extending upwardly away from said retention biasing head means to define a retention opening means thereunder to facilitate receiving of a three-dimensional workpiece therein positioned between said retention arch means and the substrate for retaining thereof, said retention biasing head means being responsive to insertion of said insertion leg means into the substrate with the exertion of force by said retention biasing head means downwardly toward the substrate to maintain said retention arch means spaced from the substrate to facilitate retaining of a workpiece therein; and D. an extraction arch means extending upwardly away from said retention biasing head means and said insertion leg means to define an extraction opening means thereunder to facilitate removal of the construction staple from the substrate, said retention biasing head means being responsive to insertion of said insertion leg means into the substrate with the exertion of force by said retention biasing head means downwardly against the substrate to maintain said extraction arch means spaced from the substrate in order to facilitate removal of the staple device from the substrate.

2. An extractable construction staple device particularly usable for removably fastening three-dimensional and planar workpieces to a substrate as defined in claim 1 wherein said extraction arch means is arcuate in shape.

3. An extractable construction staple device particularly usable for removably fastening three-dimensional and planar workpieces to a substrate as defined in claim 1 wherein said retention arch means is partially circular in shape to facilitate retaining of three-dimensional workpieces which are shaped circularly in cross-section.

4. An extractable construction staple device particularly usable for removably fastening three-dimensional and planar workpieces to a substrate as defined in claim 1 wherein said insertion leg means is adapted to be inserted downwardly first into a planar workpiece and, thereafter, secondly into a substrate immediately therebelow to facilitate also fastening of a workpiece onto the substrate which is planar.

5. An extractable construction staple device particularly usable for removably fastening three-dimensional and planar workpieces to a substrate as defined in claim 1 wherein said insertion leg means includes a first insertion leg and a second insertion leg spatially disposed distant from one another on the staple device.

6. An extractable construction staple device particularly usable for removably fastening three-dimensional and planar workpieces to a substrate as defined in claim 5 wherein said extraction arch means includes a first extraction arch and a second extraction arch, said first extraction arch being positioned between said first insertion leg and said second insertion leg adjacent said first insertion leg and said second extraction arch being positioned between said first insertion leg and said second insertion leg adjacent said second insertion leg.

7. An extractable construction staple device particularly usable for removably fastening three-dimensional and planar workpieces to a substrate as defined in claim 6 wherein said retention biasing head means includes a first retention biasing head and a second retention biasing head, said first retention biasing head being positioned between said first extraction arch and said second extraction arch adjacent said first extraction arch and said second retention biasing head being positioned between said first extraction arch and said second extraction arch adjacent said second extraction arch.

8. An extractable construction staple device particularly usable for removably fastening three-dimensional and planar workpieces to a substrate as defined in claim 7 wherein said retention arch means is positioned between said first retention biasing head and said second retention biasing head to facilitate retaining of a three-dimensional work piece therewithin.

9. An extractable construction staple device particularly usable for removably fastening three-dimensional and planar workpieces to a substrate as defined in claim 5 wherein said retention arch means and said extraction arch means are positioned between said first insertion leg and said second insertion leg.

10. An extractable construction staple device particularly usable for removably fastening three-dimensional and planar workpieces to a substrate as defined in claim 9 wherein said retention biasing head means is positioned between said retention arch means and said extraction arch means.

11. An extractable construction staple device particularly usable for removably fastening three-dimensional and planar workpieces to a substrate as defined in claim 1 wherein said insertion leg means comprises a single insertion leg extending downwardly from the construction staple device.

12. An extractable construction staple device particularly usable for removably fastening three-dimensional and planar workpieces to a substrate as defined in claim 11 wherein said extraction arch means is positioned adjacent said single insertion leg with said retention biasing head means being positioned adjacent said extraction arch means oppositely located from said single insertion leg.

13. An extractable construction staple device particularly usable for removably fastening three-dimensional and planar workpieces to a substrate as defined in claim 1 wherein said retention arch means is positioned adjacent said retention biasing head means at a position oppositely located from said extraction arch means.

14. An extractable construction staple device particularly usable for removably fastening three-dimensional and planar workpieces to a substrate as defined in claim 1 wherein said retention biasing head means, said retention arch means and said extraction arch means define serrations along the undersurface thereof to facilitate gripping of the substrate and the three-dimensional and planar workpieces thereon and to facilitate abutment with the staple device during extraction thereof.

15. An extractable construction staple device particularly usable for removably fastening three-dimensional and planar workpieces to a substrate as defined in claim 14 wherein said serrations extend in a direction longitudinal with respect to the construction staple device.

16. An extractable construction staple device particularly usable for removably fastening three-dimensional and planar workpieces to a substrate comprising:

A. an insertion leg means adapted to be inserted downwardly into a substrate therebelow to facilitate securement of the construction staple with respect thereto, said insertion leg means also being adapted to be inserted downwardly first into a planar workpiece and secondly into a substrate immediately therebelow to facilitate also fastening of a planar workpiece onto the substrate therebelow, said insertion leg means being configured to facilitate selective extraction thereof including:

(1) a first insertion leg;
(2) a second insertion leg spatially disposed distant from said first insertion leg on the staple device;

B. an extraction arch means being arcuate and partially circular in shape and extending upwardly away from said insertion leg means to define an extraction opening means thereunder to facilitate removal of the construction staple from the substrate, said extraction arch means including:
  (1) a first extraction arch positioned between said first insertion leg and said second insertion leg adjacent said first insertion leg; and
  (2) a second extraction arch positioned between said first insertion leg and said second insertion leg adjacent said second insertion leg;

C. a retention biasing head means being responsive to insertion of said insertion leg means into the substrate to exert downwardly directed force against the substrate and any planar workpiece positioned thereon, said retention biasing head means also limiting the depth of penetration of said insertion leg means into the substrate to maintain said extraction arch means spaced from the substrate, said retention biasing head means including:
  (1) a first retention biasing head positioned between said first extraction arch and said second extraction arch adjacent said first extraction arch;
  (2) a second retention biasing head positioned between said first extraction arch and said second extraction arch adjacent said second extraction arch;

D. a retention arch means being arcuate and partially circular in shape and extending upwardly away from said retention biasing head means to define a retention opening means thereunder to facilitate impermanent securing of a three-dimensional workpiece therein positioned between said retention arch means and the substrate for retaining thereof responsive to insertion of said insertion leg means into the substrate with the exertion of force by said retention biasing head means downwardly toward the substrate, said retention arch means being positioned between said first retention biasing head and said second retention biasing head to facilitate retaining of a three-dimensional work piece therewithin; and E. a plurality of serrations located along the undersurface of said retention biasing head means, said retention arch means and said extraction arch means to facilitate gripping of the substrate and the three-dimensional and planar workpieces thereon and to facilitate abutment with the staple device during extraction of said retention biasing head means.

17. An extractable construction staple device particularly usable for removably fastening three-dimensional and planar workpieces to a substrate comprising:

A. an insertion leg means adapted to be inserted downwardly into a substrate therebelow to facilitate securement of the construction staple with respect thereto, said insertion leg means also being adapted to be inserted downwardly first into a planar workpiece and secondly into a substrate immediately therebelow to facilitate also fastening of a planar workpiece onto the substrate therebelow, said insertion leg means including:
  (1) a first insertion leg;
  (2) a second insertion leg spatially disposed distant from said first insertion leg on the staple device;

B. a retention biasing head means positioned between said first insertion leg and said second insertion leg and being responsive to insertion of said insertion leg means into the substrate to exert downwardly directed force against the substrate and any planar workpiece positioned thereon, said retention biasing head means also limiting the depth of penetration of said insertion leg means into the substrate;

C. a retention arch means being arcuate and partially circular in shape and extending upwardly away from said retention biasing head means to define a retention opening means thereunder to facilitate receiving of a three-dimensional workpiece therein positioned between said retention arch means and the substrate for retaining thereof responsive to insertion of said insertion leg means into the substrate with the exertion of force by said retention biasing head means downwardly toward the substrate, said retention arch means being positioned between said retention biasing head means and said first insertion leg to facilitate retaining of three-dimensional workpieces thereunder;

D. an extraction arch means being arcuate and partially circular in shape and extending upwardly away from said retention biasing head means and said insertion leg means to define an extraction opening means thereunder to facilitate removal of the construction staple from the substrate, said extraction arch means being positioned between said retention biasing head means and said second insertion leg to facilitate extraction of the construction staple; and E. a plurality of serrations located along the undersurface of said retention biasing head means, said retention arch means and said extraction arch means to facilitate gripping of the substrate and the three-dimensional and planar workpieces thereon and to facilitate abutment with the staple device during extraction of said retention biasing head means.

* * * * *